United States Patent [19]
Fäger

[11] Patent Number: 6,157,368
[45] Date of Patent: *Dec. 5, 2000

[54] CONTROL EQUIPMENT WITH A MOVABLE CONTROL MEMBER

[76] Inventor: Jan G. Fäger, Askledargatan 12, Västerås, Sweden, SE-723 50

[*] Notice: This patent issued on a continued prosecution application filed under 37 CFR 1.53(d), and is subject to the twenty year patent term provisions of 35 U.S.C. 154(a)(2).

[21] Appl. No.: 08/809,717
[22] PCT Filed: Sep. 25, 1995
[86] PCT No.: PCT/SE95/01090
  § 371 Date: Mar. 28, 1997
  § 102(e) Date: Mar. 28, 1997
[87] PCT Pub. No.: WO96/09918
  PCT Pub. Date: Apr. 4, 1996

[30] Foreign Application Priority Data

Sep. 28, 1994 [SE] Sweden .................................. 9403255

[51] Int. Cl.[7] ....................................................... G09G 5/00
[52] U.S. Cl. ........................... 345/156; 345/157; 345/158; 345/166; 345/8; 250/221
[58] Field of Search ..................................... 345/7–8, 156, 345/157, 158, 161, 166, 175, 173, 179; 341/20, 21, 31; 250/221

[56] References Cited

U.S. PATENT DOCUMENTS

| | | | |
|---|---|---|---|
| 4,988,981 | 1/1991 | Zimmerman et al. | 345/156 |
| 5,012,049 | 4/1991 | Schier | 178/19 |
| 5,481,265 | 1/1996 | Russell | 341/22 |
| 5,521,616 | 5/1996 | Capper et al. | 345/156 |
| 5,706,026 | 1/1998 | Kent et al. | 345/156 |
| 5,850,201 | 12/1998 | Lasko-Harvill et al. | 345/8 |

FOREIGN PATENT DOCUMENTS

| | | |
|---|---|---|
| 0 202 468 A1 | 11/1986 | European Pat. Off. . |
| 0 211 984 A1 | 3/1987 | European Pat. Off. . |
| 0 312 095 A2 | 4/1989 | European Pat. Off. . |
| 0 420 500 A2 | 4/1991 | European Pat. Off. . |
| 0 526 015 A1 | 2/1993 | European Pat. Off. . |
| 0 593 047 A1 | 4/1994 | European Pat. Off. . |
| 29 06 950 B2 | 7/1981 | Germany . |
| 444530 | 4/1986 | Sweden . |
| 458427 | 4/1989 | Sweden . |
| 9007762 | 7/1990 | WIPO . |

*Primary Examiner*—Dennis-Doon Chow
*Assistant Examiner*—Amr Awad
*Attorney, Agent, or Firm*—Jacobson, Price, Holman & Stern, PLLC

[57] ABSTRACT

A control equipment provided with an operator-actuated control member (1) having a transducer (10, 11) that receives signals which propagate linearly between a plurality of signal sources ($M_1$–$M_4$) and the transducer. The equipment has means (10, CU) sensing the directions from the transducer to the sight lines from the transducer to the signal sources and, on the basis of these angles, determines the position of the control member.

27 Claims, 11 Drawing Sheets

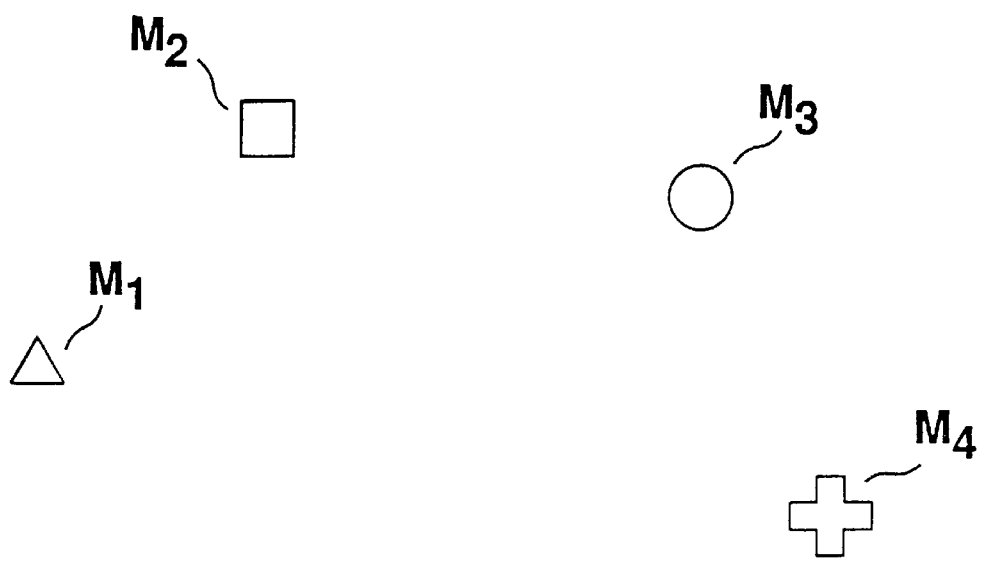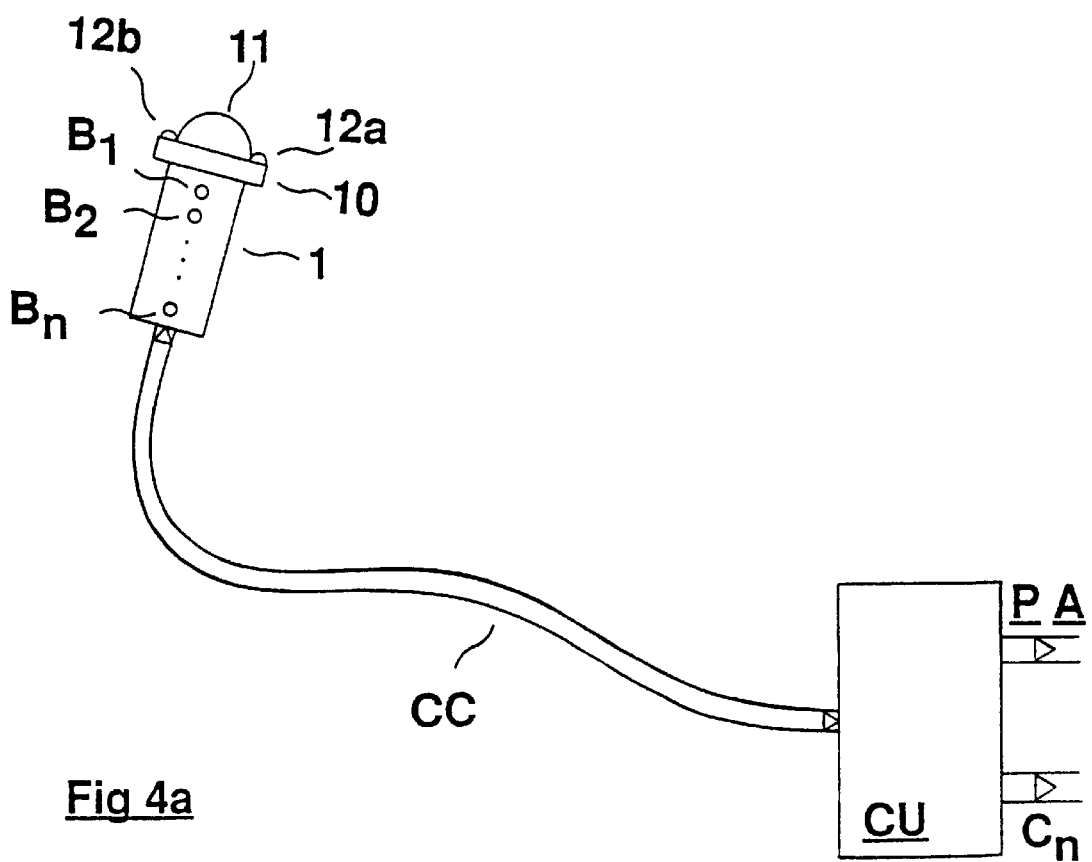
Fig 4a

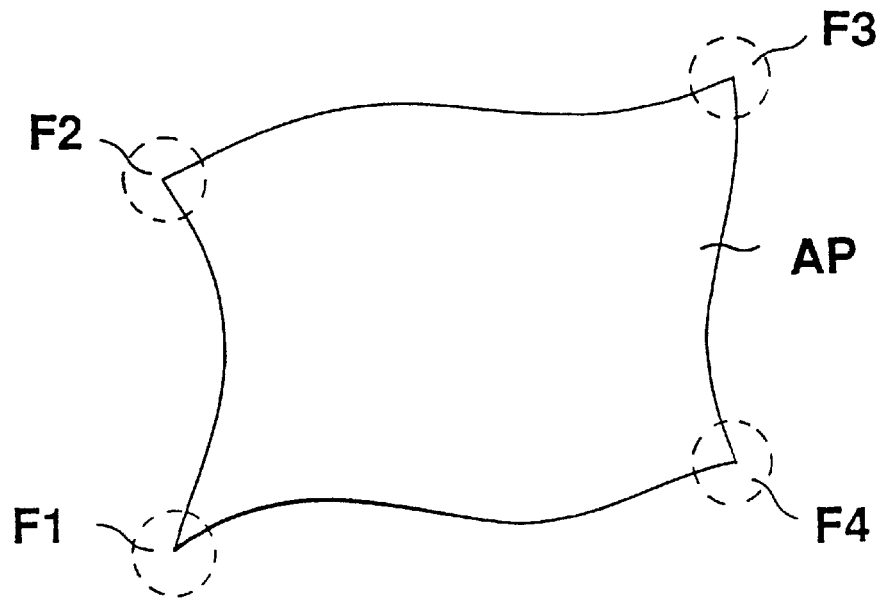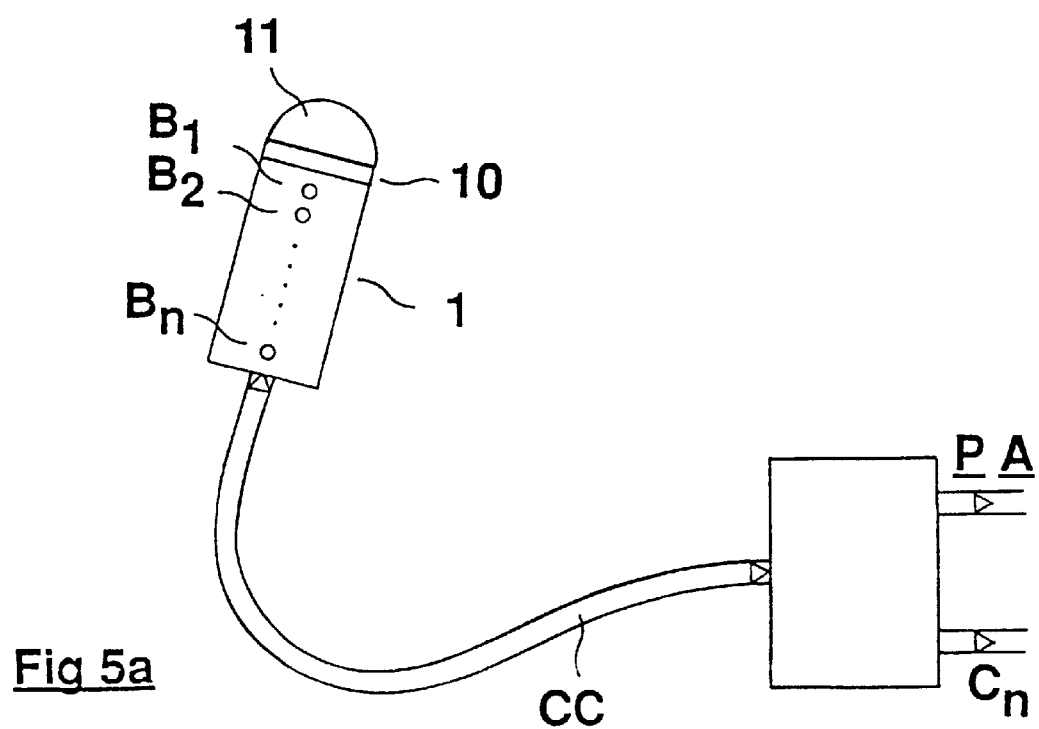
Fig 5a

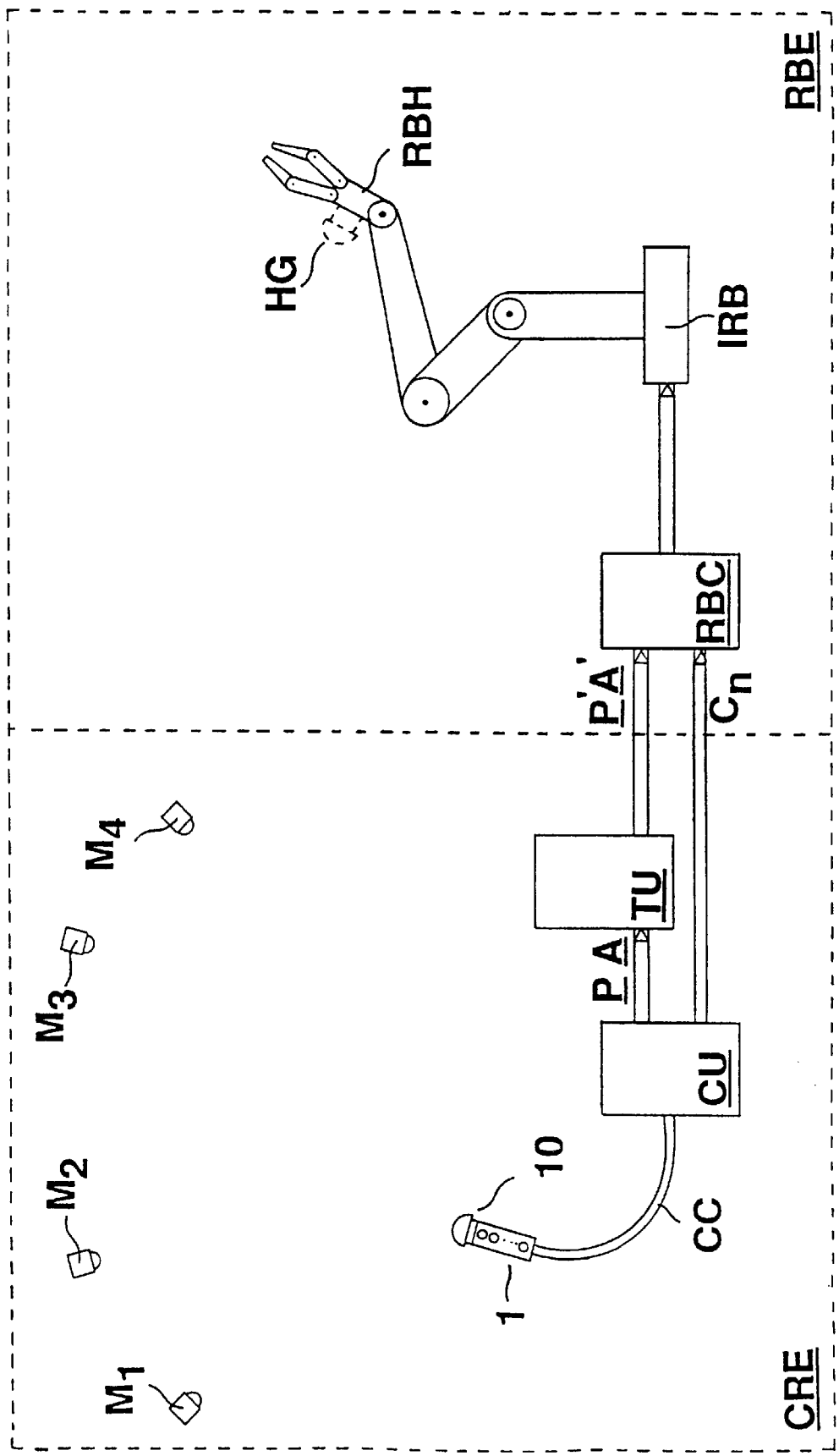

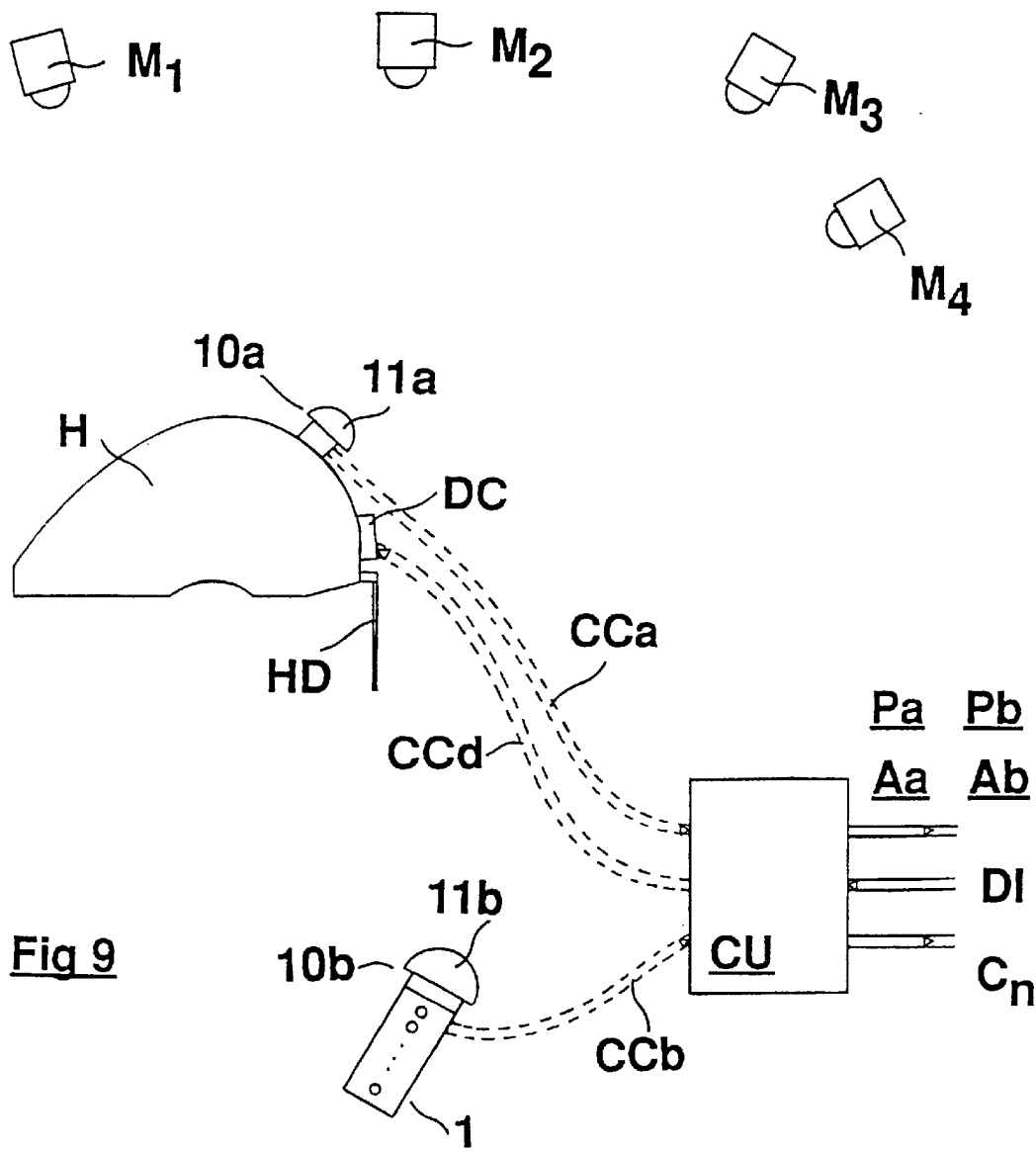

CONTROL EQUIPMENT WITH A MOVABLE CONTROL MEMBER

TECHNICAL FIELD

The present invention relates to a control equipment, having a movable control member arranged to be actuated by an operator, and arranged to emit a number of control signals, dependent on the position and/or orientation of the control member, in order to control an object.

Control equipment of the type to which the invention relates can be used for controlling arbitrary equipment or processes. Examples of applications are the control of computer equipment and displays and the control of industrial robots.

In this application the term "control" covers any type of influence exerted by an operator on a device, equipment or process. The term thus includes, e.g.

controlling the position and/or orientation of a mechanical object, e.g. of the hand of a real or simulated industrial robot when programming the robot, moving a cursor in a computer display entering commands to a computer by pointing to the desired command on a menu display, selecting the desired menu from several available computer menus selecting presentation of the desired part of a display object, selecting the angle of viewing in computer simulations, for instance.

Thus in this application the terms "control member", "control equipment", "control signal", etc. refer in a corresponding manner to members, equipment, signals, etc. for effecting "control" or which are used in connection with "control".

A three-dimensional object can have up to six degrees of freedom, three translations xyz and three angles $\alpha$, $\beta$, $\delta$ of rotation. The "position xyz" of the object—in the sense of the concept as used in the present application—is defined by the three magnitudes specifying translations in relation to the origo of the coordinate system under consideration. The "orientation" $\alpha,\beta,\delta$ of the object—in the sense of the concept as used in the present application—is defined by the three magnitudes specifying the angles of rotation in the coordinate system.

In practice an object often has fewer than six degrees of freedom. A cursor on a computer display, for instance, usually has two degrees of freedom. Its orientation is constant (or irrelevant), and its position is characterized by two variables. Similarly a three-dimensional object may have such limitations that it has fewer than six degrees of freedom. A block, for instance, movable on a table has three degrees of freedom—two variables indicate its position on the table and one variable its orientation (i.e. its angle of rotation around an axis perpendicular to the table). As will be shown below, a typical control equipment according to the invention enables control in six degrees of freedom. However, such equipment can also be used with advantage for controlling objects having fewer than six degrees of freedom.

The term "degree of freedom" of a controlled object does not refer here only to the conventional concept of the degree of freedom of a mechanical object or system, but in general to a variable of the controlled object which can be influenced by the control equipment. A degree of freedom of a controlled object may thus comprise a physical magnitude, such as position along a certain coordinate axis, angle of rotation, velocity in a certain direction, flux or temperature, or some other arbitrary magnitude or function that can be influenced.

The term "optical signals" in this application relates to signals consisting of, or making use of, optical radiation both within and outside the visible wavelength band.

BACKGROUND ART

Two types of known control means enabling simultaneous control in more than a single degree of freedom are a joystick and a mouse of the type used for controlling computers. However, these control means have several drawbacks.

A mouse thus permits simultaneous control in only two degrees of freedom.

A joystick has also normally only two degrees of freedom. However, such a stick can be designed for control in three or possibly even more degrees of freedom. However, when using a joystick with more than two degrees of freedom it is difficult or impossible to achieve good accuracy of control and it is also difficult for the operator to coordinate movements of the joystick with movements of the controlled object.

If control is required in more degrees of freedom than two (or possibly three), as is often the case, the mouse or joystick can, in a manner known per se, be switched between control of different sets of degrees of freedom. For instance, when programming an industrial robot it is known to use a joystick with three degrees of freedom where the function of the joystick can be switched to control either the position of the tool center point of the robot hand (three translation variables) or the orientation of the robot hand (three rotation variables). However, this makes the control complicated and slow.

Furthermore, these known control means have mechanical limitations which reduce their flexibility and thus their general usefulness. A mouse, for instance, requires a flat surface such as a table or the like, and a joystick must be mounted and journalled on some form of base or platform to which the position of the stick is referred. This means that these control means are typically cumbersome and often require the operator to use both hands. They are therefore unsuitable or unusable in many applications such as in uncomfortable work positions and/or in confined spaces.

Another considerable drawback of these known control means is that, when more than two degrees of freedom are involved it is difficult or impossible to obtain a natural agreement in all the controlled degrees of freedom between movements of the control means and movements of the controlled object. The work of the operator therefore becomes complicated and slow.

A known control system enabling control in six degrees of freedom is the "Polhemus system" (Polhemus Inc., Colchester, Vt., USA). The system uses a triple-axis magnetic dipole source and a triple-axis magnetic field sensor. By sequentially varying the magnetic field emitted, three mutually independent excitation vectors are produced. The three vectors sensed by the sensor contain sufficient information to determine the position and orientation of the sensor in relation to the source. However, this system has a number of drawbacks, one of which is its sensitivity to other magnetic fields in the vicinity, which e.g. may hinder its use in workshop environments, where there are a number of varying magnetic fields from motors, etc. Another drawback is that large metal objects in the vicinity have a negative effect on the accuracy of the system which in practice makes it unusable on the production line of automobile bodies, for instance. Another drawback is that the sensor must be relatively close to the source of the magnetic field, which greatly limits its work area if high accuracy is also required. These drawbacks mean that the system can only be used in special environments.

A control means for a computer is known through patent application WO 9007762 A1. A pen-shaped control member contains a transmitter that emits a modulated signal, e.g. an optical or acoustic signal. The control member can be moved in a plane in which three fixed receivers are arranged. The phase differences between the signals received are determined and produce the differences in the distance between the control member (transmitter) and the receivers, and thereby the position of the control member in the plane. By arranging a fourth receiver outside said plane the position of the control member can be determined in three dimensions. It is implied that the orientation of the control member can also be determined by providing the control member with more transmitters.

A similar three-dimensional control means is known through patent application EP 0420500 A2. A pen-shaped control member is provided with two acoustic transmitters spaced from each other. The positions of the transmitters in three dimensions can be determined by measuring the transmission times from the transmitters to each of four fixed receivers. It is also mentioned that the measured positions of the transmitters can be used to determine the orientation of the control member in two degrees of freedom. Arranging three transmitters on the control member would also allow determination of the orientation in the third degree of freedom.

Yet another control means of similar type—a three-dimensional mouse for controlling a computer cursor—is known through EP 0526015 A1. The mouse has an acoustic transmitter and three receivers are arranged around the computer screen. The transmission times of the audio signals to the three receivers are determined and the position of the transmitter (mouse) is calculated in three dimensions from this information.

In the case of the three last control means discussed, the positions of the transmitters are determined in relation to fixed receivers. In two of these arrangements the control member is provided with two or more transmitters located a certain distance apart, and the orientation of the control member is then calculated on the basis of the measured positions of the transmitters in relation to the fixed receivers and of the distance between the transmitters. To be of any practical use, a hand-held control member of this type must have very limited dimensions, e.g. at the most of the order of magnitude of a decimetre or so. The short distances between the different transmitters in the control member, together with the unavoidable inaccuracy and the limited resolution of the determination of the positions, means that the accuracy and the resolution in the determination of the orientation is low. The accuracy and the resolution in the determination of the orientation may possibly be sufficient for the stated area of application—control of a computer display—but in practice they are certainly not sufficient for more demanding control tasks, e.g. for controlling an industrial robot or other machine that must perform with precision.

A basic feature of these three control means is that each requires at least three fixed receivers receiving signals from the transmitter (or transmitters) in the control member, in order to determine its position. These receivers are relatively complicated and expensive and they must be connected by means of cables or other signal channels to some form of common signal-processing equipment. Furthermore the work areas with regard to position and orientation of the control member of the devices described are extremely limited. Practical use in arbitrary environment usually requires a large work area and that, throughout its entire work area, the device is able to function even if parts of the field of vision of the transmitters are blocked by the operator or by machine parts or work pieces. For this to be possible, the devices described would have to be provided with a large number of receivers distributed over the work area, which would make them expensive and complicated.

DESCRIPTION OF THE INVENTION

The object of the invention is to produce a control equipment of the type described in the introduction, which is generally usable in all normal home, office and industrial environments, which also enables simple simultaneous control in up to six degrees of freedom in these environments, in which the control member can operate within a large work area, in which, throughout the entire work area of the control member, both as regards position and orientation, the equipment has such high accuracy and resolution that it can be used for applications requiring extremely high precision, e.g. for controlling industrial robots, missiles or computers in Virtual Reality (VR) applications, in which the control member has small dimensions and full mechanical freedom so that only one hand is needed for control, leaving the operator's other hand free, and so that the control member can even be used in cramped spaces or places difficult to access, in which the control member can be designed so that, even as regards all six degrees of freedom in a three-dimensional object, for instance, a natural agreement is obtained between the movements of the control member and the movements of the controlled object, thereby making the operator's work simpler and quicker, which has an accurate absolute-measuring function, and which is so designed that only extremely simple fixed members are required and that, if desired, such members can be completely omitted, thereby making the control equipment simple, flexible and inexpensive.

The characteristic features of a control equipment according to the invention are revealed in the appended claims.

An equipment according to the invention measures primarily angles, i.e. the orientation of the control member is obtained as a primary magnitude and therefore with great accuracy, and the position can then be calculated with desired accuracy. Another basic feature of the equipment according to the invention is that the receiver is arranged in the control member. As will be described below, the members emitting signals can be designed in an extremely simple manner and may even consist of details already existing around the equipment. These and other features ensure that an equipment according to the invention more than satisfies the conditions stated above and thus offers considerable advantages over previously known equipment.

DESCRIPTION OF THE DRAWINGS

The invention will be described in more detail in the following with reference to the accompanying FIGS. 1–11.

FIG. 4a shows another example of an equipment according to the invention, which makes use of special light sources illuminating reflecting markers, of a video camera and of an image-processing system that determines the position of the markers in the camera image.

FIG. 4b shows schematically the structure of the signal-processing circuits in the equipment according to FIG. 4a.

FIG. 5a shows another example of equipment according to the invention, where the signal sources consist of existing details in the surroundings of the system, the positions of which can be determined with the aid of a video camera and an image-processing system.

FIG. 5b shows schematically the structure of the signal-processing circuits in the equipment according to FIG. 5a.

FIG. 6 shows how equipment according to the invention can be connected to an industrial robot to control the position and/or orientation of the robot hand.

FIG. 9 shows how the equipment according to FIG. 8 can be supplemented by a display unit arranged on the helmet.

DESCRIPTION OF EMBODIMENTS

Figure 1:
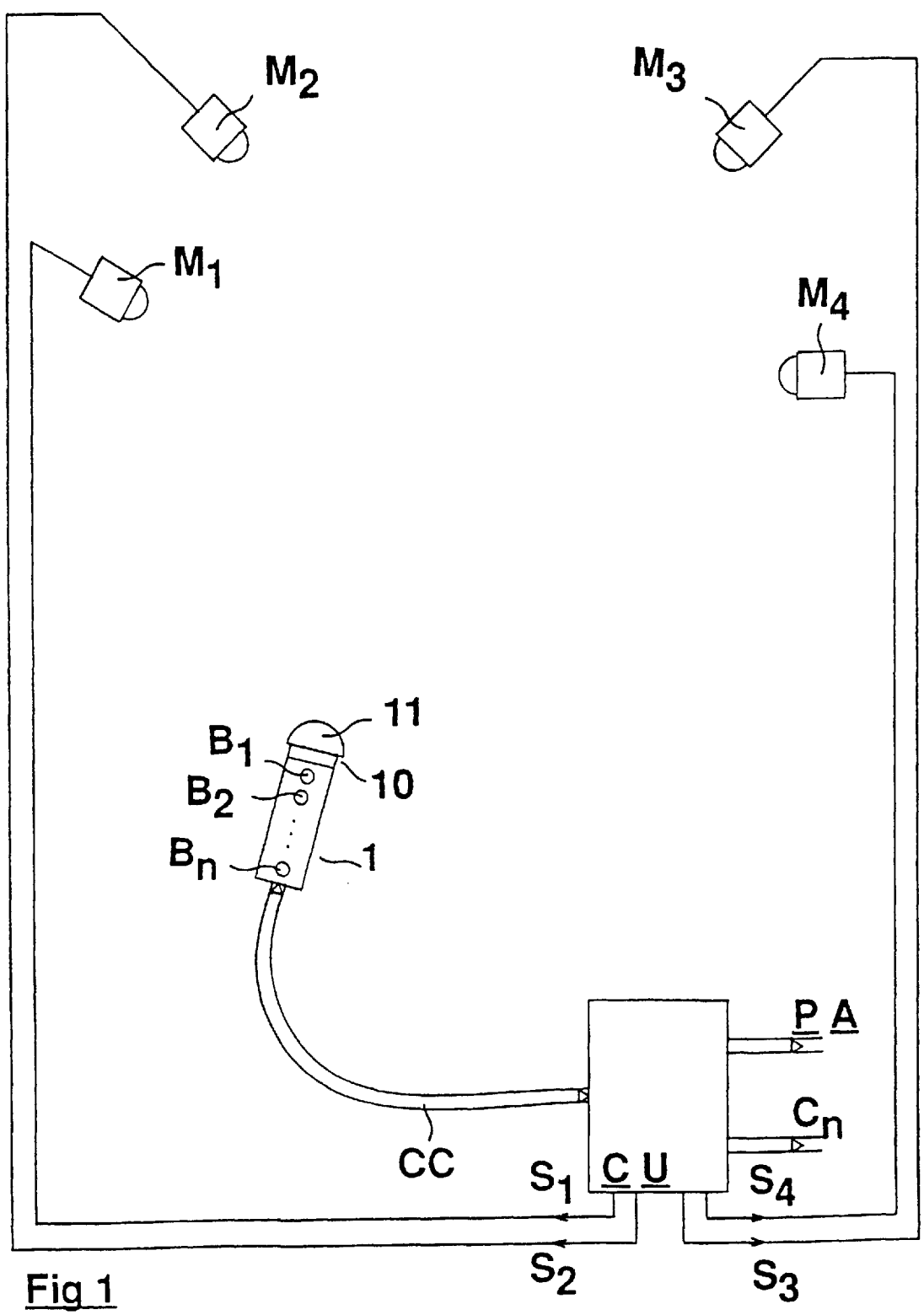
FIG. 1 shows schematically an example of the structure of a control equipment according to the invention.

FIG. 1 describes an example of a control equipment according to the invention. It is provided with a control member 1 in the form of a loose handle, designed so that it can be held comfortably in the handof an operator. At one end the control member 1 is provided with a transducer 10 with a wide-angle lens 11 and some electronics for evaluating the image the lens produces on the image surface of the transducer.

The transducer is a two-dimensional transducer using the measuring principle described in Swedish patent specification 8404246-4, publication number 444 530. However, this publication does not describe an operator-actuated control member, but an industrial robot whose control system includes feedback-value transducer that utilizes this measuring principle.

Several signal sources in the form of light emitting diodes $M_1$, $M_2$, $M_3$ and $M_4$ are arranged spaced from the control member and from each other so that, during normal use of the control member, at least three of the signal sources will always be within the field of vision of the transducer. The positions of the signal sources in relation to each other are known, e.g. by measuring the positions of the sources in a coordinate system common to them all.

The control member 1 also has a number of pushbuttons $B_1, B_2, \ldots B_n$. These preferably have such functions that all communication between on the one side the operator, and on the other side the control equipment and the controlled object, can be performed by means of the control member 1. An example of such a pushbutton function is the function of the push button on a computer mouse, i.e. activation of the button results in entry into the computer of position and/or orientation of the control member, of the position of a marker indicated by means of the control member, or execution of a command, etc. indicated in a menu.

Another desired function in this connection is that activation of a certain pushbutton is required for the displacement of the control member to cause a corresponding displacement or other change in the controlled object. This avoids unintentional alteration of position or orientation of the control member causing undesired control measures.

The control member 1 is in communication with a control and calculation unit CU via a communication channel CC. This channel may consist of a flexible cable or—to permit the operator the greatest possible freedom—of a cordless link, e.g. an IR link. Information is sent via the channel CC to the unit CU both from the transducer 10 concerning the positions of the images of the various signal sources in the image, and also from the various pushbuttons $B_1 \ldots B_n$ of the control member.

The unit CU emits such signals $s_1 \ldots s_4$ to the signal sources $M_1 \ldots M_4$ that the signal sources are activated periodically and one at a time, thereby enabling the equipment to continuously keep track of which signal source a certain measurement relates to.

The unit CU thus continuously calculates, as described in more detail in the above-mentioned Swedish patent specification, the position and orientation of the transducer 10, i.e. of the control member 1. Briefly, the calculation is performed by selecting three signal sources, determining the directions $\phi, \theta$ in relation to the transducer 10 of the sight lines from the transducer to these signal sources, calculating the angles $T_{12}, T_{23}, T_3$, between the sight lines so that the position and orientation of the transducer (=control member) are finally obtained by utilizing these angles, $T_{12}, T_{23}, T_{31}$, the directions $\phi, \theta$ of the sight lines, the known positions of the signal sources and geometrical relations between these magnitudes. The position of the control member is obtained in the form of data defining a three-dimensional vector P and its orientation in the form of a three-dimensional vector A.

Signals $C_n$ are also emitted from the unit CU. These signals specify the positions of those of the control member's pushbuttons that can influence the controlled object (some of the pushbuttons may be intended only- to influence the control equipment).

Figure 2A:
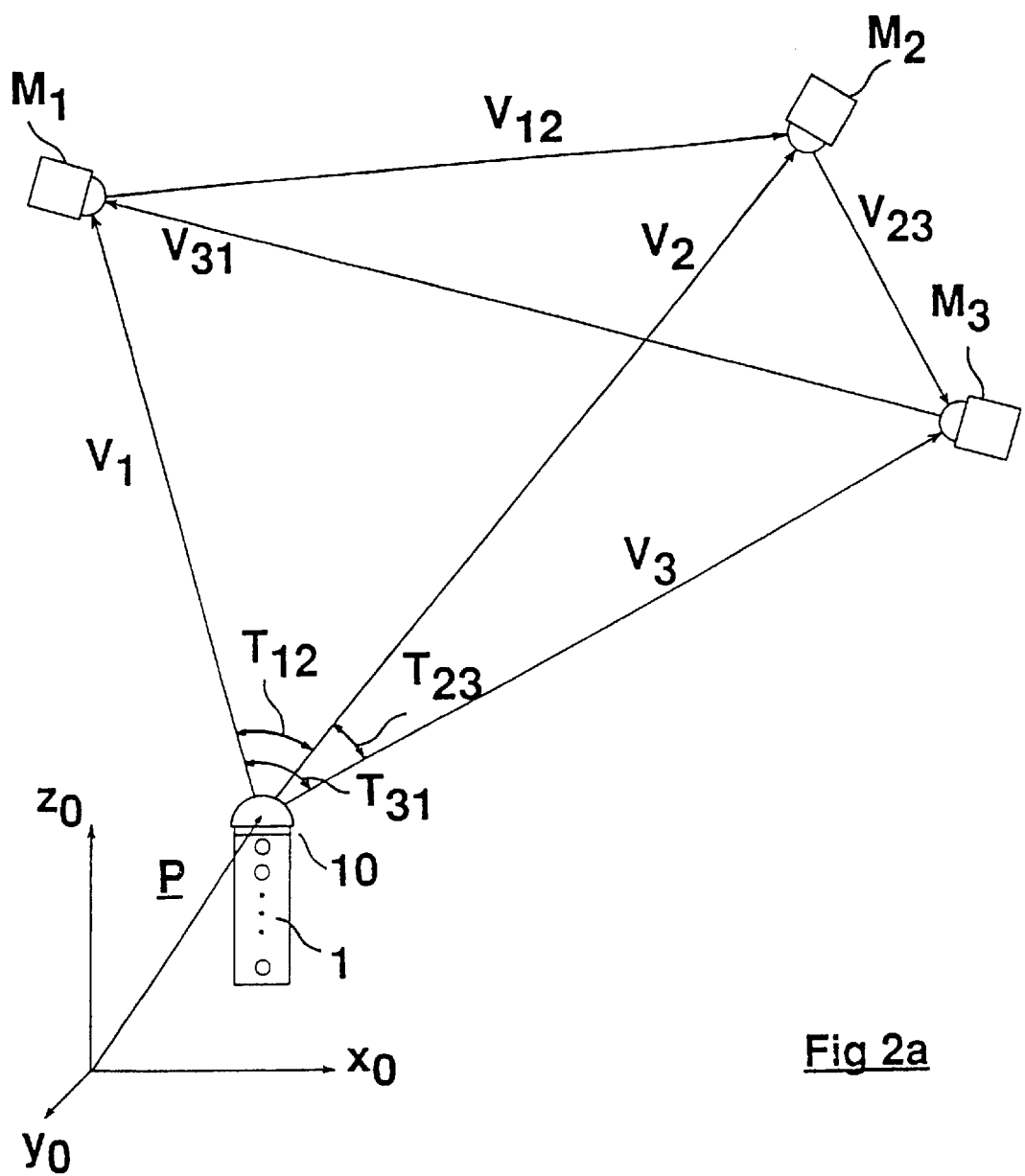
FIG. 2a and FIG. 2b reveal certain of the coordinate systems and magnitudes used for the calculations.

FIG. 2a shows schematically the control member 1 with the transducer 10 and three signal sources $M_1$–$M_3$. The positions of the signal sources; in relation to each other are presumed known, i.e. the vectors $V_{12}, V_{23}$ and $V_{31}$ are known. Alternatively the relative positions of the signal sources can be known indirectly since the position of each source in a coordinate system $x_0, y_0, z_0$ is known. The position of the transducer 10 in this coordinate system is designated P. The directions from the transducer to the signal sources are designated by the vectors $V_1, V_2, V_3$. The angles between the sight lines from the transducer to the signal sources are designated $T_{12}, T_{23}$ and $T_{31}$.

Figure 2B:
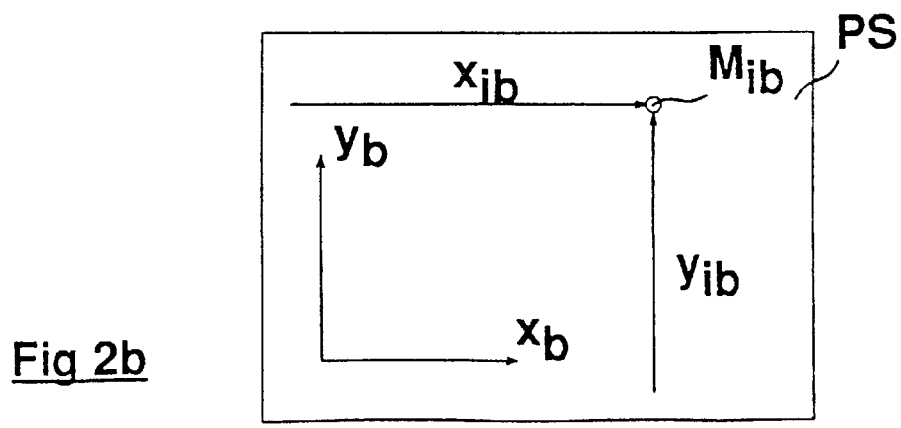

FIG. 2b shows schematically the image surface PS of the transducer, with the image $M_{ib}$ of the signal source $M_i$. The position of the image on the image surface is defined by the coordinates $x_{ib}, y_{ib}$.

Figure 3:
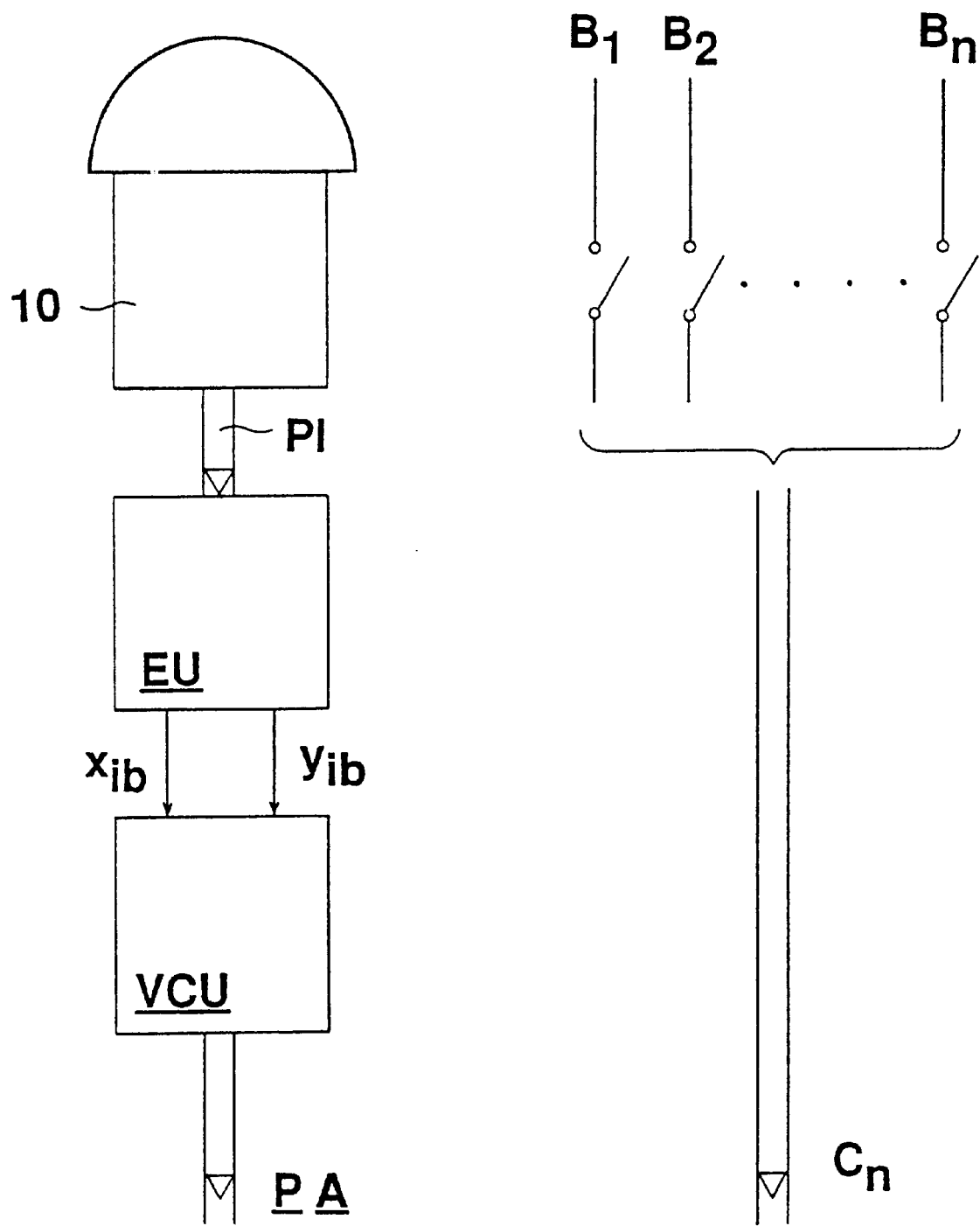
FIG. 3 shows schematically the structure of the signal-processing circuits in the equipment according to FIG. 1.

FIG. 3 shows how the signal/signals/image information PI obtained with the aid of the transducer 10 is supplied to an evaluation circuit EU which, on the basis of the transducer signals, determines the position in the image—$x_{ib}, y_{ib}$—for each of the signal sources. This information is supplied to: a calculating unit VCU which continuously calculates both vectors P and, A defining the position and orientation of the transducer/control member. In the example described these vectors constitute the control signals emitted by the control equipment. The structure of the transducer and the structure and function of the calculating circuits are described in more detail in the above-mentioned Swedish patent specification, publication No. 444 530.

FIG. 3 also shows schematically how the positions of the control member pushbuttons $B_1 \ldots B_n$ define the information $C_n$ which is passed on to the other parts of the control equipment and/or to the controlled object (see FIG. 1).

To use the control equipment the operator grasps the member 1 in one hand and activates it, e.g. by holding down one of the pushbuttons $B_1 \ldots B_n$. By giving the control member a translation movement the operator can influence the three variables covered by the vector P and by giving the control member a rotational movement the operator can influence the three variables covered by the vector A.

Figure 4B:
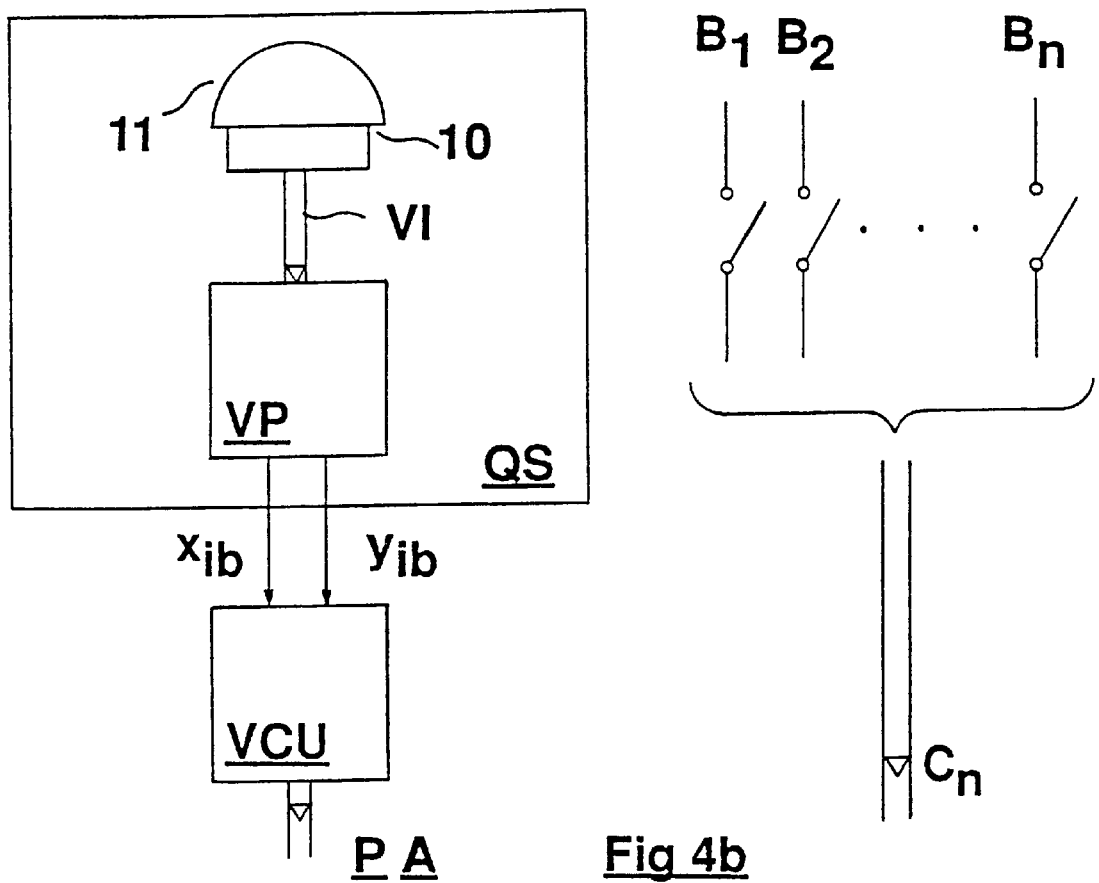

FIG. 4a and FIG. 4b show an alternative embodiment of a control equipment according to the invention in which the transducer 10 and its equipment for image evaluation comprise equipment (QS in FIG. 4b) that operates according to the same principle as the MacReflex system available from Qualisys AB, Ögärdesvägen 2, S-433 30 Partille, Sweden. This system is described in the system documentation, e.g. in MacReflex—Clear-sighted movement analysis MacReflex: Technical Specification, Qualisys AB 1993

The MacReflex System, a new tool for testing industrial robots

Kinematic Measurement Products, MacReflex System Accessories, Qualisys AB 1994

Stefan Axelsson: "Photographic Surveillance of Industrial Robot Errors and Evaluation of two Camera Systems", Chalmers University of Technology, Department of Production Engineering, Licentiate Thesis, Gothenburg 1992.

FIG. 4a shows the control member 1 which, as in the embodiment described previously, consists of a handle with transducer 10–11 and pushbuttons $B_1$–$B_n$. The transducer comprises a video camera of CCD type with a wide-angle lens 11. The control member is joined via the signal channel CC to the calculation unit CU which continuously calculates the position and orientation of the control member in the form of the vectors P and A which, together with the information $C_n$ from the control member pushbuttons $B_1 \ldots B_n$, constitute the output signals of the control equipment.

The signal sources in this case are reflecting markers $M_1$–$M_4$ made of reflecting tape, for instance. The markers may be flat figures or they may consist of reflecting spheres so they will show the same shape irrespective of the angle they are seen from. In the system illustrated in FIG. 4a the markers have different shapes so as to enable the signal-processing circuits to identify and distinguish between the various markers (alternatively markers of the same shape but different sizes may be used for the same purpose). A number of light sources are arranged near the lens 11 of the transducer, of which sources 12a and 12b are shown. The light sources emit infrared light, preferably pulsed or modulated with a certain frequency in order to separate the relevant signals from extraneous light sources. The light emitted is reflected by the markers and the image produced by the transducer's video camera contains representations of the markers. The video camera is provided with an IR filter in order to further reduce the influence of extraneous light sources.

Since, amongst other things, the system operates with IR light, the camera detects great contrast between the markers and the surroundings. The system is therefore able to work with a simple image-processing system which e.g. scans the image line by line and senses if the video signal is above or below a certain level. Alternatively, of course, light within a frequency band in the visible area may be used.

The contours thus obtained—or characteristics derived therefrom—are compared with pre-stored contours or characteristics of the markers in order to identify them. When selecting suitable characteristics it should be observed that they should be independent of distance. A quotient between two measured characteristic dimensions, for instance, can be used as identifying characteristic. The position of the representation of a marker may suitably be defined and determined as the position of the centre of gravity of the contour line or the surface encompassed by it.

The video signal VI of the transducer (see FIG. 4b) is supplied to a video processor VP. This analyzes the image, identifies the markers and determines the position $x_{ib}$, $y_{ib}$ of each marker in the image. This information is supplied to the calculation circuit VCU which, in the manner described above, on the basis of this information and of the known positions of the markers in relation to each other, continuously calculates the information—the vectors P and A—defining the position and orientation of the control member. This information, and the information $C_n$ from the pushbuttons $B_1 \ldots B_n$, thus constitute the control signals emitted by -the control equipment.

Naturally other types of video cameras than CCD cameras may be used, e.g. cameras using diode arrays as light-sensing elements. Similarly some or all of the light sources 12a, 12b, etc. may be mounted separate from the transducer 10.

In the two embodiments of the invention described above the signal sources consist of specially arranged active (FIGS. 1–3) and passive (FIGS. 4a–4b) optical transducers. Active transducers (e.g. light emitting diodes) may of course be used as signal sources also in the second embodiment instead of the passive reflecting markers described.

FIG. 5a shows another alternative embodiment of the invention. In -this embodiment no specially arranged signal sources are required. Instead suitable details $F_1$–$F_4$ already existing in the surroundings or on a work object, e.g. the body of an automobile, may be used as signal sources. In this case the transducer 10 of the control member according to the invention consists of a video camera equipped with a wide-angle lens 11, arranged to depict the surroundings, and a conventional image-processing system is arranged to analyze the image, to identify the selected details and determine their positions in the image. On the basis of the positions thus determined, the position and orientation of the transducer is then continuously calculated as described above in with reference to FIGS. 1–5.

The transducer 10 is arranged in the control member 1 as described previously, and communicates with the calculation unit CU by way of a communication channel CC. In the same way as in the embodiments described earlier, the calculation unit supplies information concerning The position and orientation of the control member in the form of the signals P and A, and the information $C_n$ from the control member pushbuttons.

Figure 5B:
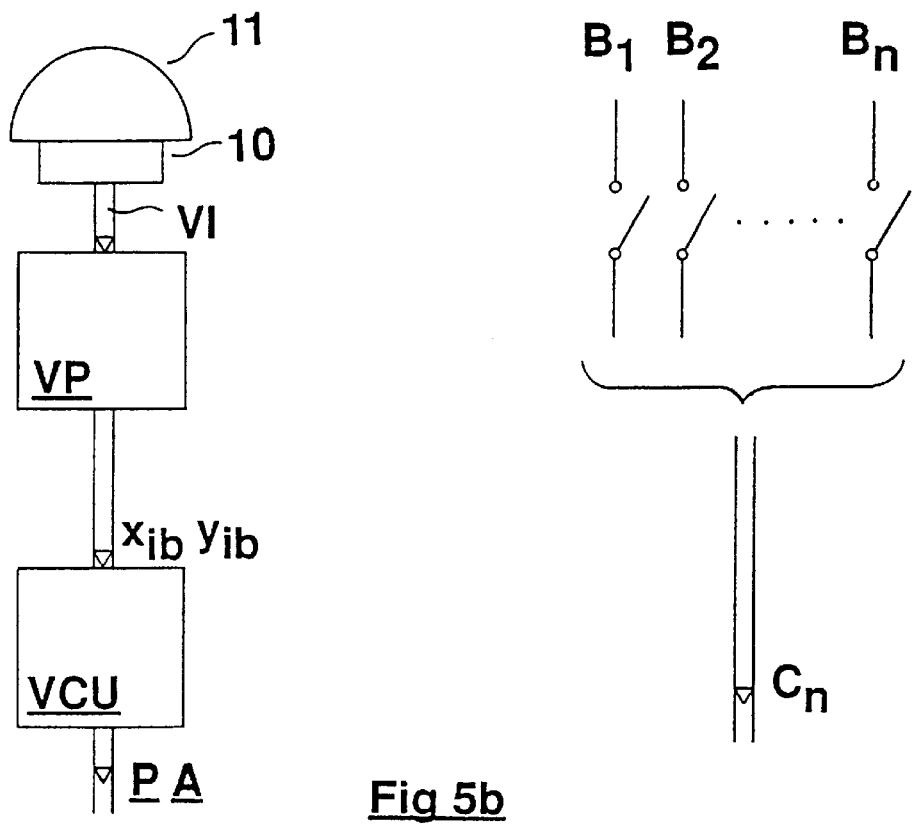

As shown in FIG. 5b, the video signal VI is supplied from the transducer (video camera) 10 to an image-processing system (video processor) VP which, like the video processor shown in FIG. 4b, analyzes the image, identifies the markers and determines their positions $x_{ib}$ and $y_{ib}$ in the image. These positions are supplied to the calculation circuit VCU which, in a maimer corresponding to that described earlier, calculates the information—the vectors P and A—indicating the position and orientation of the control member.

Examples of suitable details are corners, holes and so on, which can be dearly picked out by a video system and which have a characteristic appearance and a well-defined and known position. These details are pointed out and identified in suitable manner when the system is started up, and their positions determined and stored, e.g. by down-loading from a CAD system. In the example shown in FIG. 5a the details $F_1$–$F_4$ comprise four corners of an opening AP in a work object, e.g. a body of an automobile.

The system described with reference to FIGS. 5a–5b requires no special light sources. The details utilized as signal sources may be illuminated by the ordinary lighting on the premises, but special light sources may of course be used if necessary to provide the desired intensity or character of light. As in the equipment described with reference to FIGS. 4a–4b, the signals emitted from the signal sources consist of the reflected light received by the transducer.

Obviously in this case also, at least some of the signal sources may consist of specially applied markers, e.g. pieces, patterns or figures of light tape placed on a dark background.

Swedish patent specification 8600872-9, publication No. 458 427, describe,s in more detail how the position and orientation of a transducer based on this measuring principle can be calculated, as well as the structure and function of an equipment for implementing this calculation. This publication does not, however, describe an operator-actuated control member, but equipment for an industrial robot in which the control system contains a feedback-value transducer which utilizes this measuring principle.

In the control equipments described above according to the invention the signal-processing circuits may of course be distributed in suitable manner between the movable control member and a fixed electronic unit (u"1 " and CU, respectively, in FIG. 1). In some cases the signal-processing circuits may be so small that they can be entirely housed in the actual control member, in which case a fixed electronics unit might even be omitted altogether or house only such circuits as are required for communication between the control member and the environment or a controlled object.

In the equipments described above with reference to FIGS. 1–5 only four signal sources have been shown per equipment, for the sake of simplicity. As stated in the patent specifications mentioned, it may be suitable! to provide a larger number of signal sources, distributed in suitable manner so that, regardless of the position and orientation of the control member irk its work area, there are always at least three signal sources within the field of view of the transducer, with sufficiently different directions seen from the transducer, to ensure the required measuring accuracy. Since the use of only three signal sources may give rise to ambiguities in certain planes, it may be advisable to ensure that at least in the vicinity of these planes there are at least four separate signal sources present within the field of view of the transducer and used for the measuring.

FIG. 6 shows a control equipment CRE according to the invention connected to and arranged for control of an industrial robot equipment RBE. As described above, the calculation unit CU of the control equipment continuously emits the signals P and A defining the position and orientation of the control member 1. The robot equipment consists of a control and drive unit RBC which governs the movements of the robot. The actual robot IRB is provided with a robot hand RBH with a work tool (shown here as a gripper). The control signals from the control equipment CRE are connected to the control unit RBC as command values for the position of the tool center point (TCP) of the robot hand and for the orientation of the robot hand. A displacement of the control member will therefore cause a corresponding alteration in the control signal P which in turn causes a corresponding displacement of the position of the tool center point (TCP) of the robot. Similarly, a change in the orientation of the control member will result in a corresponding change in the control signal A and thus a corresponding change in the orientation of the robot hand RBH.

The control equipment suitably includes a transformation unit TU for coordinate transformation of the control signals P and A from the coordinate system in which the control equipment operates, to control signals P' and A' in the coordinate system in which the robot operates. Such a transformation enables a desired correspondence between the movement of the control member and the movement of the robot hand to be achieved, e.g. so that a movement of the control member in a certain direction causes a movement of the tool center point for the robot hand in the same direction, and so that a rotation of the control member about a certain axis causes the robot hand to rotate about an axis parallel with said axis.

In the application described above a translation movement of the control member causes a corresponding translation movement of the robot hand, and a rotation of the control member causes a corresponding change in the orientation of the robot hand. This connection between the control member and the controlled object is often suitable and natural when controlling both position and orientation of an object. In other cases it may be suitable to arrange the connection in some other manner. For instance, if the orientation of the controlled object is constant or irrelevant, a rotation of the control member right-left or up-down may be made to cause a translation right-left or up-down of the controlled object. The desired functions can be obtained by suitable programming of the controlled object's own control members. Alternatively the control equipment according to the invention may be provided with circuits for transformation in desired manner of the signals (P, A) corresponding to position and orientation of the control member to suitable control signals for the controlled object.

A transducer HG (shown in broken lines in FIG. 6), suitably of the same type as the transducer 10, may be arranged on the robot hand and used in the robot's control system as feedback value transducer for the position and/or orientation of the robot hand. The transducer HG may then be coordinated with the transducer 10 so that, for instance, the two transducers make use of all or some of the same signal sources and/or control and calculation equipment, thereby achieving simplification of the equipment as a whole.

If the absolute measurement facility of the system is utilized, and the two transducers (10 and HG) utilizes the same markers, a selectable offset should be introduced in position and/or orientation between the control member 1 and the robot hand.

Figure 7:
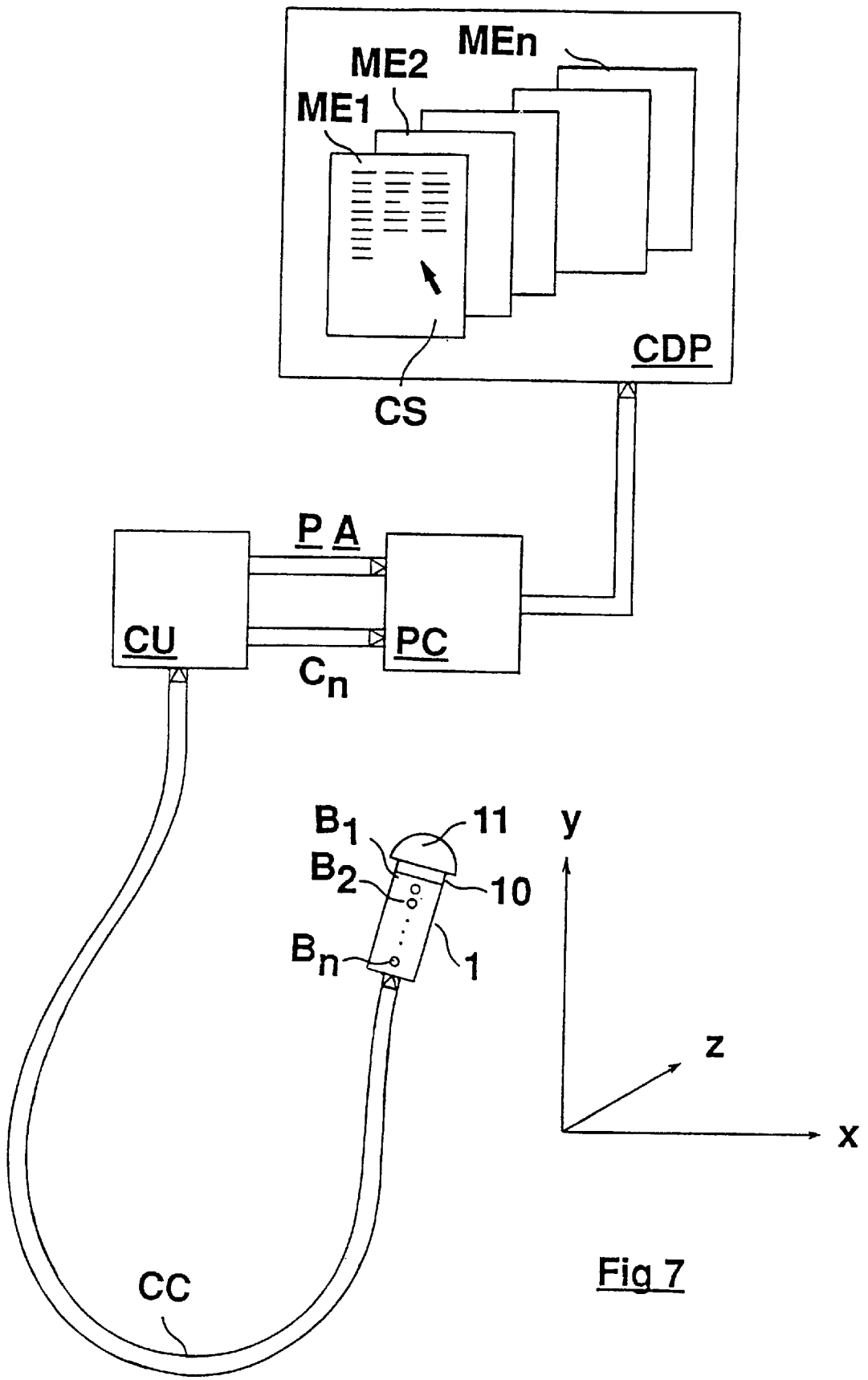
FIG. 7 shows how equipment according to the invention can be connected to a computer to control a menu display.

FIG. 7 shows a control equipment according to the invention arranged for controlling a computer PC with a menu display CDP. The control member 1 is connected to the calculation unit CU of the control equipment, which supplies the control signals P and A to the computer, as well as the information $C_n$ from the control member pushbuttons $B_1$–$B_n$. For the sake of simplicity, the signal sources of the control equipment are omitted in FIG. 7.

In the example shown the axes X and Y of the coordinate system X, Y, ;7 of the control equipment are parallel with the display plane and the axis Z is perpendicular to this plane.

The menu display consists in known manner of a number of menus ME1, ME2, . . . MEn. For the sake of clarity the menus are shown one behind the other. The desired menu is selected with the aid of the control member 1 as described below. Each menu contains several commands or the like. A command can be effected by selecting the desired menu, and by pointing to the desired command with a cursor CS.

The control member 1 is arranged to control the choice of menu and the cursor. This can be done in various ways, depending on how the computer is programmed to utilize the control signals from the control equipment. Displacement of the control member in the Z direction may suitably be arranged to cause flipping through the menus. When the desired menu has been found, the cursor CS is moved by moving the control member in a plane parallel with the display. A lateral movement (X-direction) of the control member imparts a corresponding movement to the cursor, and a vertical movement (Y-direction) of the control member will cause the cursor to move vertically.

Alternatively the connection between the control member and the display may be achieved in some other manner. Lateral movement of the cursor may be effected, for instance, by rotating the control member about the Y axis and vertical movement by rotating the control member about the X-axis.

It may be suitable to provide the control member with one or more pushbuttons with functions ensuring that unintentional movement of the control member does not unnecessarily result in intervention in the computer display. The control member may be provided with a pushbutton, for instance, which only permits flipping through the menus when the button is depressed. When the desired menu has been found the pushbutton is released so that unintentional movement to a different menu by accidental movement of the control member in Z-direction cannot occur. A pushbutton with a corresponding function can be arranged for movement of the cursor. Furthermore, a pushbutton with the function "ENTER" can suitably be arranged. When the desired menu has been selected and the cursor placed on the desired command in the menu, this pushbutton is activated and causes the command to be entered or executed.

In the two examples of applications of a control equipment according to the invention, described with reference to FIGS. 6 and 7, it is assumed that a certain displacement of the control member will result in a directly corresponding movement, e.g. proportional movement (or alteration of state) of the controlled object. However, the connection between the movement of the control member and the movement (or in the general case the altered state) of the controlled object may be designed in some other way. In certain cases, for instance, it may be suitable to give the connection between control member and controlled object a fully or partially integrating function, i.e. the position (or orientation or state) of the controlled object changes at a rate that is dependent on the deviation from a zero position of the position or orientation of the control member.

The velocity of the movement or rotation of the control member may possibly be calculated by differentiation of the position or orientation and used as control signal or as a component in a control signal.

To enable both rapid movement and accurate fine adjustment of a controlled object, it may be suitable to be able to vary the "transmission ratio" between the movement of the control member and the movement or alteration of state of the controlled object. According to one embodiment of the invention, therefore, one or more of the pushbuttons of the control member 1 are arranged to influence the gain in the transmission between control member and controlled object. Depression of the pushbutton $B_1$, for instance, is arranged to reduce the gain from a normal value in order to enable fine adjustment. Furthermore, if desired, depression of the pushbutton $B_2$, for instance, may be arranged to increase the gain from the normal value to enable rapid movement (or other desired alteration in state) of the controlled object.

Figure 8:
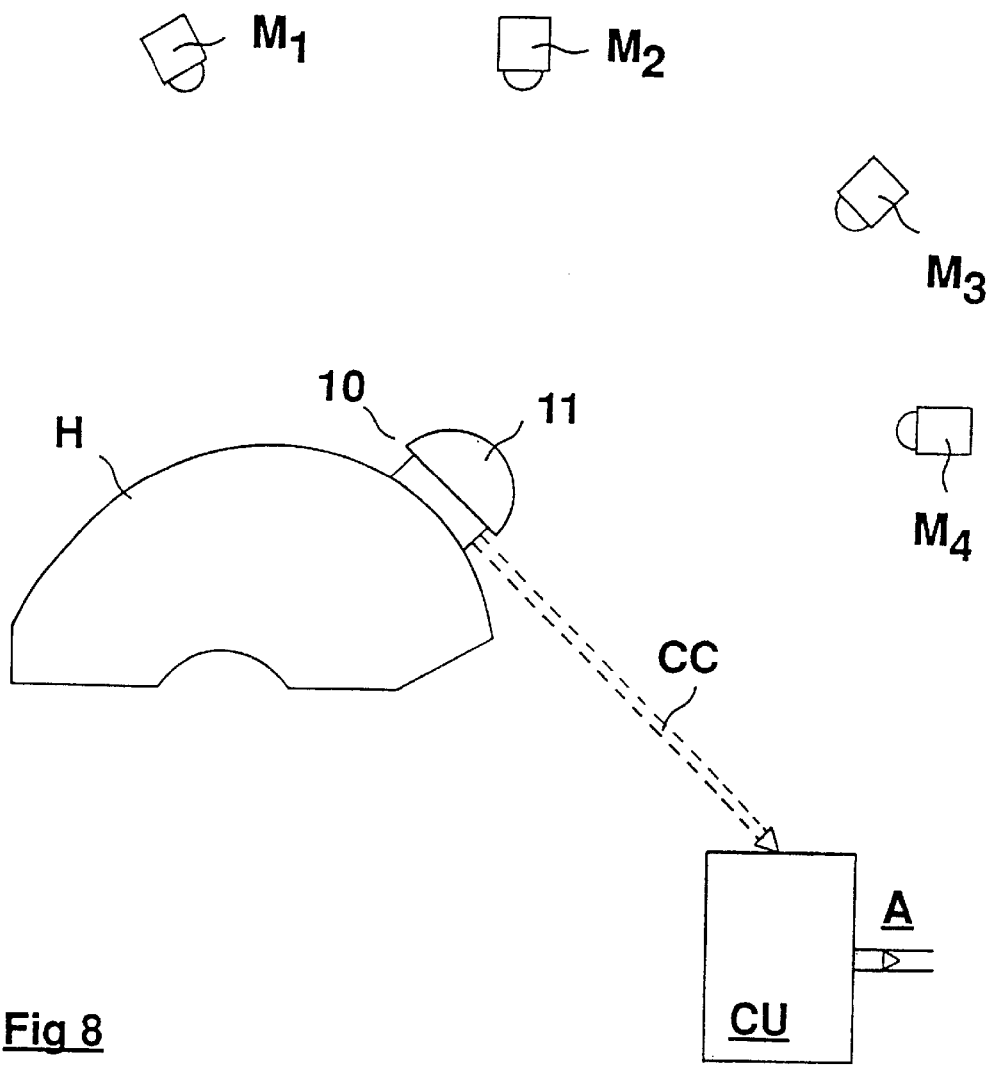
FIG. 8 shows an alternative embodiment of equipment according to the invention, comprising a helmet to produce control signals by means of head movements.

FIG. 8 shows an alternative embodiment of a control equipment according to the invention. The control member here consists of a helmet H arranged to be placed on the head of an operator. A transducer 10 with wide-angle lens 11 is arranged at a suitable spot on the helmet, e.g. on the front of the helmet as shown in the FIG. The transducer is arranged to receive optical signals from active or passive signal sources $M_1-M_4$ and communicates with a control unit CU via a cable or a cordless channel CC. The signal sources, transducer and the signal-processing circuits included in the equipment dare designed as described with reference to FIGS. 1–5. In the example shown the equipment is arranged to emit a two-dimensional control signal A, the two variables of which are determined by moving the head/helmet up-down and turning it right-left. The control signal is suitably arranged to influence a controlled object, e.g. a cursor on a computer display screen so that nodding movements of the head move the object up-down and turning movements of the head move the cursor right-left.

As described above, the equipment according to the invention enables control in up to six degrees of freedom and the device shown in FIG. 8 can be designed for control in more than two degrees of freedom, in which case the control signal produced by the equipment is arranged to contain additional components dependent on the position and/or orientation of the head.

A hand-held control member of the type described earlier with reference to FIGS. 1–5 may suitably supplement the equipment according to FIG. 8.

The control m ember borne on the he ad and the hand-held control member may then be arranged to control one object each, or separate degrees of freedom for the same control led object. Pushbuttons on the hand-held member may be arranged also to influence the control function effected by means of the member borne on the head. Alternatively the hand-held member may be provided only with pushbuttons and no transducer part.

FIG. 9 shows an alternative embodiment of a control equipment according to the invention which, like the equipment according to FIG. 8, comprises a head-borne control member in the form of a helmet H with a transducer $10a-11a$ arranged on it, which communicates with the calculation unit CU via the communication channel CCa. The equipment is also provided with a hand-held control member 1 of the type described with reference to FIGS. 1–5. This control member is provided with a transducer $10b-11b$ and communicates with the unit CU via the communication channel CCb. A display screen HD, preferably of LCD type, is arranged on the helmet within the field of vision of the operator. The screen is driven from a drive unit DC arranged on the helmet and communicating with the calculation unit CU via a communication channel CCd (alternatively—in order to reduce the weight of the helmet—the drive unit may be arranged separate from the helmet).

In the example described here it is assumed that the control equipment according to FIG. 9 communicates with and controls a computer. Control 25 signals Pa, Pb are emitted to the computer as described above, which are dependent on the two control members and control signals Aa and Ab dependent on the orientations of the control members, and also with the aid of command signals $C_n$ produced by the pushbuttons on the hand-held control member. Display information DI is obtained from the computer, the 30 content of which is presented on the screen HD, possibly stereoscopically, i.e. with a separate screen for each eye.

Movement of the helmet influences the control signals in up to six degrees of freedom and, with the help of the hand-held control member, control can be obtained in up to six more degrees of freedom. An advantageous application of the equipment is to allow vertical and lateral orientation of the helmet to control the information to be presented on the screen HD. This control is suitably performed so that turning the helmet results in the same alteration of the screen display as the change in the operator's natural picture of his environment that a corresponding turning movement would have caused. Such computer information, for instance, may present an image of an artificial environment to the operator, e.g. of a landscape in a flight simulator. In that case, the part of the environment in front of the operator and within his field of vision is presented on the screen, and by turning his head the operator can observe the desired part of the artificial environment in a natural manner. In this application the hand-held control member 1 can be used to control other functions of the screen display or for functions completely separate from the screen display.

Alternatively the computer information may consist of a large number of documents arranged beside each other in vertical and lateral direction, where only one or a few of the documents at a time can be displayed on the screen HD. By turning his head the operator can "look at" the documents in a natural manner and selected the one desired. The hand-held control member 1 is then suitably used for controlling a cursor on the screen.

An equivalent function can be used, for instance, if the operator desires to study a small part of a large and complicated display in detail. By activating a control means, e.g. a pushbutton on the control member 1, the operator's field of vision is limited so that only a small part of the display is shown on the screen, enlarged. By moving his head in vertical and lateral direction the operator can then in a natural way "look at" and thereby select the desired part from the larger display for presentation on the screen HD.

In the embodiments described with reference to FIGS. 8 and 9 the control member is designed as a helmet for placing on the head of an operator. Obviously the control member need not be in the form of a complete helmet, but may instead constitute some other suitable frame for application of a transducer and possibly a display screen on the head of an operator.

As mentioned above, with an equipment according to the invention, the positions of the signal sources in relation to each other must be known. One way of achieving this is to measure the positions of the signal sources, in relation to each other or in relation to a common origin using some known method (e.g. a tape measure, geodetic methods) and, when the equipment is started up, to supply this positional information to the calculation unit.

In the embodiments described above, the signal sources have been separated from each other by being activated periodically one after the other, or by having different shapes or sizes that can be distinguished by an image-processing system. However, all markers (passive signal sources) may possibly be identical in which case, when the equipment is started up, the markers are identified in the picture by the operator and given separate identities. The equipment can then keep track of the individual markers and their positions during operation, e.g. by utilizing the fact that the physical position and orientation of the control member can only change with limited speed.

Alternatively identification of a few identical markers can be achieved by means of a semi-automatic procedure. The equipment is programmed to make a first assumption as to the markers identity, after which the position of the control member is calculated on the basis of this assumption. The operator then moves the control member and the new position is calculated under the same assumption. If the assumption is incorrect the calculated difference in position will be unrealistic and the equipment will make a new assumption and the operator a new movement until a realistic result shows that a correct assumption has been made.

Figure 10:
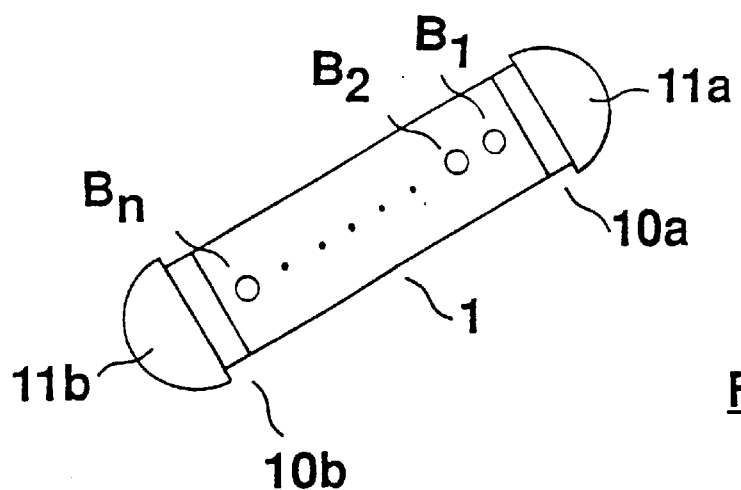
FIG. 10 shows a hand-held control member with a transducer at each end.

The hand-held control member described above (e.g. "1" in FIG. 1) may be provided with a transducer at each end in order to increase the likelihood of at least three signal sources always being within the field of view of the transducers, regardless of the orientation of the control member. Such a control member is shown in FIG. 10 and has a transducer 10a with lens 11a at one end and a transducer 10b with lens 11b at the other end.

Similarly, and for the same reason, a helmet according to the invention ("H" in FIG. 8) may be provided with several transducers with different orientations.

A control system according to the invention can be used for control of a CAD display on a computer. The control member can then be used to "take hold of" and displace/turn an object shown on the CAD display in the same way as a real object.

An equipment according to the invention can in similar manner be used, for instance, to control a simulated industrial robot or other mechanical device shown on a CAD display.

An equipment according to the invention can be provided with two hand-held control members, one for each of the operator's hands. This enables control in 12 degrees of freedom. Such an equipment is shown schematically in FIG. 11. It has two control members 1a and 1b with transducers 10a and 10b and communication channels CCa and CCb to the calculation unit CU (for the sake of clarity the markers are not shown in the drawing). The equipment supplies control signals which can be summarized as four three-dimensional vectors, Pa, Pb and Aa, Ab, respectively. A first set of control signals—the vectors Pa and Aa—is influenced by the position and orientation of the first control member 1a, and a second set—the vectors Pb and Ab—is influenced by the second control member 1b.

Figure 11:
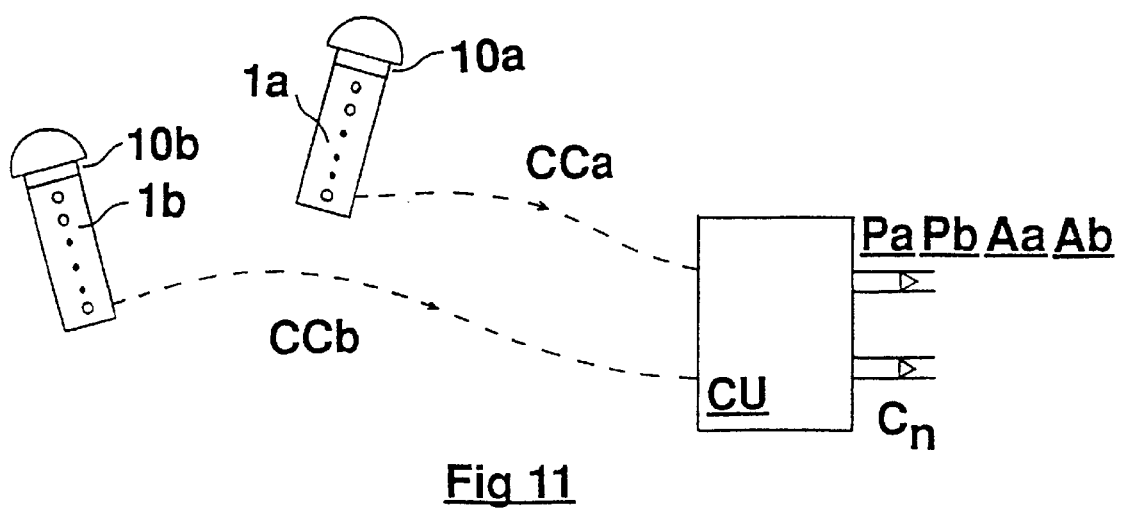
FIG. 11 shows a control equipment according to the invention having two hand-held control members.

An equipment of the type shown in FIG. 11 may be used for simultaneously and independently influencing the position and orientation of two objects shown on a CAD display. Such an equipment may be used, for instance, to simulate how a bolt and a nut are screwed together.

If an equipment according to the invention, with two hand-held control members, is used to control a mechanical equipment, e.g. an industrial robot, shown on a CAD display, one of the control members may be used to control the direction and distance of observation, for instance, and the other control member can be used to control movement of the equipment, e.g. the position and orientation of a robot hand. Alternatively this function can be obtained with the help of a single control member which can be switched between the two functions.

Hand-held and head-borne control members have been described above. An equipment according to the invention may alternatively comprise control members influenced and/or carried by some other part of the operators body.

The controlled objects described above are only examples and an equipment according to the invention can be used for controlling e.g. arbitrary process equipments, for instance, mechanical or electrical equipments or display systems other than those described above.

The examples of equipments according to the invention described above utilize optical signals from active or passive signal sources to determine positions. Other types of signals may alternatively be used, e.g. signals within other parts of the electromagnetic wavelength range than the optical part, such as microwaves, or acoustic signals, such as ultrasonic signals.

The measuring system in a control equipment according to the invention is absolute-measuring and at every moment it provides accurate information as to the absolute position of the transducer in the coordinate system where the signal sources are arranged, without having to be periodically set to zero, calibrated or the like. This is an important advantage. A hand-held control member of the type described above can thus be used, for example, for off-line programming of an industrial robot. The control member is passed along the desired robot path and the control signals obtained from the control equipment then contain information that accurately defines the path and, if desired, the varying orientation (vectors P and A in the above description) of the robot hand along the path.

What is claimed is:

1. Control equipment, having a movable control member arranged to be actuated by an operator, and arranged to supply control signals dependent on the position and/or orientation of the control member, in order to control a controlled object, said control member comprising a transducer designed to receive signals from a set of at least three signal sources, located at points apart from each other and arranged to emit signals that propagate linearly between the signal sources and the transducer, said transducer producing signal information $X_{ib}$, $Y_{ib}$ corresponding to the direction $\phi$, $\theta$ of incidence of each individual signal received, and said control equipment comprising members arranged to receive the signal information and to produce direction-defining signals defining the direction in relation to the transducer, of the sight lines from the transducer to each of the signal sources, and calculation means arranged to produce, on the basis of said direction-defining signals, information defining the position and/or orientation of the control member.

2. The control equipment as claimed in claim 1, wherein the calculation means are arranged to determine the angles between sight lines from the control member to the signal sources and, on the basis of these angles, produce said information defining the position of the control member.

3. The control equipment as claimed in claim 1, wherein by utilizing said direction-defining signals the calculation means is arranged to produce information which defines the orientation of the control member.

4. The control equipment as claimed in claim 1, wherein the signal sources are arranged to emit optical signals and the transducer is arranged to receive the optical signals.

5. The control equipment as claimed in claim 4, wherein the signal sources constitute active light-emitting light sources.

6. The control equipment as claimed in claim 4, wherein the control equipment comprises a light source and the signal sources consist of light-reflecting members arranged to reflect light from said light source.

7. The control equipment as claimed in claim 4, wherein the control equipment comprises image-processing means arranged to produce the direction-defining signals corresponding to the positions of the signal sources in an image of the surroundings produced in the transducer.

8. The control equipment as claimed in claim 1, wherein the control member is arranged to be hand-held and operated manually by an operator.

9. The control equipment as claimed in claim 8, wherein the control member is designed as a handle with the transducer provided at one end.

10. The control equipment as claimed in claim 8, wherein the control member is provided with a transducer at each end.

11. The control equipment as claimed in claim 8, wherein the control equipment comprises two hand-held control members each arranged to influence a separate set of control signals.

12. The control equipment as claimed in claim 1, wherein the control member is provided with a number of control devices enabling command signals to be issued.

13. The control equipment as claimed in claim 1, wherein the control member consists of a helmet or frame arranged to be worn on and operated by the head of an operator.

14. The control equipment as claimed in claim 13, wherein the control member comprises a display unit arranged in the field of vision of an operator carrying the control member.

15. The control equipment as claimed in claim 1, wherein said control equipment produces said direction-defining signals defining the direction in relation to the transducer on the basis of the direction $\phi$, $\theta$ of incidence of the sight lines from the transducer to each of the signal sources, and produces, on the basis of said direction-defining signals, information defining the position and orientation of the control member.

16. The control equipment as claimed in claim 15, wherein the calculation means are arranged to determine the angles between sight lines from the control member to the signal sources and, on the basis of these angles, produce said information defining the position of the control member.

17. The control equipment as claimed in claim 15, wherein the signal sources are arranged to emit optical signals and the transducer is arranged to receive the optical signals.

18. The control equipment as claimed in claim 17, wherein the signal sources constitute active light-emitting light sources.

19. The control equipment as claimed in claim 17, wherein the control equipment comprises a light source and the signal sources consist of light-reflecting members arranged to reflect light from said light source.

20. The control equipment as claimed in claim 17, wherein the control equipment comprises image-processing means arranged to produce the direction-defining signals corresponding to the positions of the signal sources in an image of the surroundings produced in the transducer.

21. The control equipment as claimed in claim 15, wherein the control member is arranged to be hand-held and operated manually by an operator.

22. The control equipment as claimed in claim 21, wherein the control member is designed as a handle with the transducer provided at one end.

23. The control equipment as claimed in claim 21, wherein the control member is provided with a transducer at each end.

24. The control equipment as claimed in claim 21, wherein the control equipment comprises two hand-held control members, each arranged to influence a separate set of control signals.

25. The control equipment as claimed in claim 15, wherein the control member is provided with a number of control devices enabling command signals to be issued.

26. The control equipment as claimed in claim 15, wherein the control member consists of a helmet or frame arranged to be worn on and operated by the head of an operator.

27. The control equipment as claimed in claim 26, wherein the control member comprises a display unit arranged in the field of vision of an operator carrying the control member.

* * * * *